(12) United States Patent
Kim et al.

(10) Patent No.: US 8,611,292 B2
(45) Date of Patent: Dec. 17, 2013

(54) METHOD AND APPARATUS FOR DYNAMIC STATION ENABLEMENT PROCEDURE

(75) Inventors: Eunsun Kim, Seoul (KR); Yongho Seok, Seoul (KR)

(73) Assignee: LG Electronics Inc., Seoul (KR)

( * ) Notice: Subject to any disclaimer, the term of this patent is extended or adjusted under 35 U.S.C. 154(b) by 477 days.

(21) Appl. No.: 12/888,563

(22) Filed: Sep. 23, 2010

(65) Prior Publication Data
US 2011/0310815 A1    Dec. 22, 2011

Related U.S. Application Data

(60) Provisional application No. 61/355,563, filed on Jun. 17, 2010, provisional application No. 61/361,434, filed on Jul. 5, 2010, provisional application No. 61/357,083, filed on Jun. 21, 2010, provisional application No. 61/359,803, filed on Jun. 29, 2010.

(51) Int. Cl.
*H04W 4/00*    (2009.01)

(52) U.S. Cl.
USPC .......................................... 370/329; 370/338

(58) Field of Classification Search
None
See application file for complete search history.

(56) References Cited

U.S. PATENT DOCUMENTS

| | | | |
|---|---|---|---|
| 2002/0006788 A1 | 1/2002 | Knutsson et al. | 455/422 |
| 2003/0207683 A1 | 11/2003 | Lempio et al. | 455/422.1 |
| 2009/0258603 A1* | 10/2009 | Ghaboosi et al. | 455/68 |
| 2010/0128565 A1* | 5/2010 | Golparian | 367/79 |
| 2011/0087639 A1* | 4/2011 | Gurney | 707/690 |
| 2011/0116458 A1* | 5/2011 | Hsu et al. | 370/329 |
| 2011/0310253 A1* | 12/2011 | Singh et al. | 348/184 |
| 2012/0008604 A1* | 1/2012 | Kasslin et al. | 370/338 |
| 2012/0134328 A1* | 5/2012 | Gauvreau et al. | 370/329 |
| 2012/0282959 A1* | 11/2012 | Abraham et al. | 455/500 |

OTHER PUBLICATIONS

IEEE Std 802.11y, "IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 3: 3650-3700 MHz Operation in USA", Sep. 2008, entire document.*
International Search Report dated Jun. 21, 2011.

* cited by examiner

*Primary Examiner* — Suk Jin Kang
(74) *Attorney, Agent, or Firm* — Morgan, Lewis & Bockius LLP

(57) ABSTRACT

A method and an apparatus for Dynamic Station Enablement (DSE) procedure in a wireless local area network system are disclosed. For a method of enabling a dependent station to operate within a white space as an unlicensed device by an enabling station, the method comprises: transmitting, from the enabling station to the dependent station, an enabling signal to permit the dependent station to operate within a TV white space; transmitting, from the enabling station to the dependent station, a white space map element which indicates an available channel list in the TV white space such that the dependent station operates only within the available channels identified by the white space map element, wherein the white space map element is transmitted via one of a beacon frame, a probe response frame and a white space map announcement frame; and exchanging a DSE (dynamic station enablement) related message between the enabling station and the dependent station on one or more of the available channels identified by the white space map element.

26 Claims, 14 Drawing Sheets

Fig. 6

| Element ID | Lenght | DSE Registered Location element body field |
|---|---|---|
Octets:   1   1   20

Fig. 7

| B0 | B5 | B6 | | B30 |
|---|---|---|---|---|
| Latitude Resolution | | Latitude Fraction | | |

Bits    6                  25

| B31 | B39 B40 | B45 |
|---|---|---|
| Latitude Integer | Longitude Resolution | |

Bits          9            6

| B46 | B70 B71 | B79 |
|---|---|---|
| Latitude Fraction | Latitude Integer | |

Bits         25            9

| B80 | B83 B84 | B89 B90 | B97 |
|---|---|---|---|
| Altitude Type | Altitude Resolution | Altitude Fraction | |

Bits    4        6          8

| B98 | B119 B120 | B122 |
|---|---|---|
| Altitude Integer | Datum | |

Bits        22           3

| B123 | B124 | B125 | B126 B127 |
|---|---|---|---|
| RegLoc Agreement | RegLoc DSE | Dependent STA | Reserved |

Bits    1      1      1      2

| B128 | B143 |
|---|---|
| Dependent Enablement Identifier | |

Bits          16

| B144 | B151 B152 | B159 |
|---|---|---|
| Regulatory Class | Channel Number | |

Bits       8         8

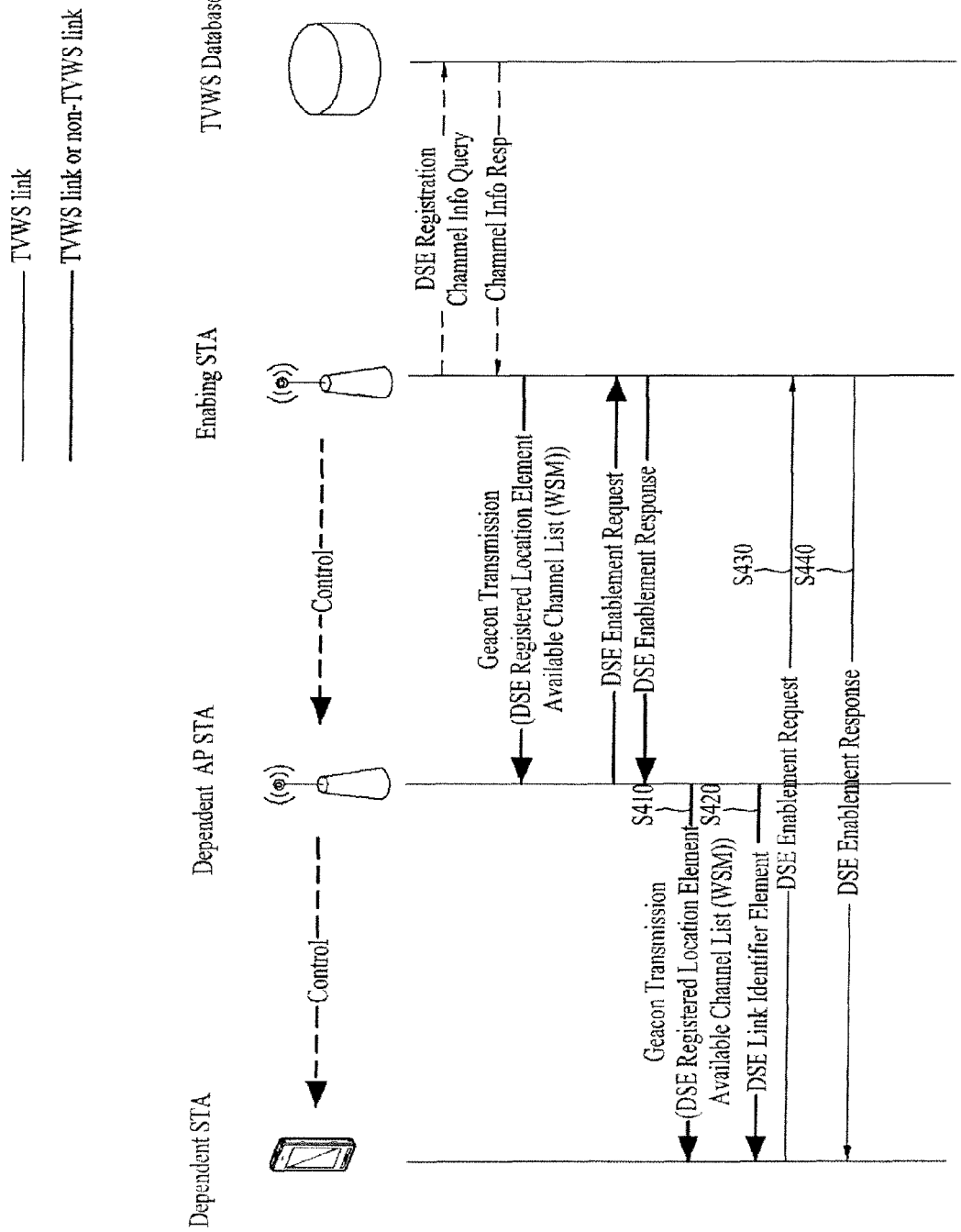

Fig. 10

| Element ID | Length | ResponderSTA Address | BSSID (optional) |
|---|---|---|---|
| Octets: 1 | 1 | 6 | 0 or 6 |

(a)

| Element ID | Length | Enabling STA Address | Enabling STA Timestamp | BSSID |
|---|---|---|---|---|
| Octets: 1 | 1 | 6 | 8 | 6 |

| Category | Action Value | Requester STA Address | Responder STA Address | Reason Result Code | Enablement Identifier |
|---|---|---|---|---|---|
| 1 | 1 | 6 | 6 | 1 | 2 |

Octets:

Fig. 12

| Element ID | Lenght | WSM Type | WSM Information |
|---|---|---|---|
| 1 | 1 | 1 | variable |

Octets:

Fig. 13

These two fields are
repeated, as determined
by the Lenght field

| Map ID | Channel Number | Maximum Power Level |
|---|---|---|

Octets:  1  1  1

Fig. 14

| Type | Map version |
|---|---|

Bits:  0  1-7

Fig. 15

| Map ID | Channel Number | Maximum Power Level | Channel Number | Maximum Power Level | Channel Number | Maximum Power Level |
|---|---|---|---|---|---|---|

Octets:  1  1  1  1  1

Fig. 16

| Category | Action | WEM element body field |
|----------|--------|------------------------|
| 1 | 1 | variable |

Octets:

METHOD AND APPARATUS FOR DYNAMIC STATION ENABLEMENT PROCEDURE

CROSS-REFERENCE TO RELATED APPLICATIONS

This application claims the benefit of U.S. Provisional Application Ser. Nos. 61/355,563, filed on Jun. 17, 2010, 61/361,434, filed on Jul. 5, 2010, and 61/357,083, filed on Jun. 21, 2010, the contents of which is hereby incorporated by reference herein in their entirety. This application also claims the benefit of U.S. Provisional Application Ser. No. 61/359,803, filed Jun. 29, 2010.

BACKGROUND OF THE INVENTION

1. Field of the Invention

The present invention relates to a wireless local area network (WLAN), and more particularly, to a method and apparatus for Dynamic Station Enablement (DSE) procedure in a wireless local area network system.

2. Discussion of the Related Art

The standard for a Wireless Local Area Network (WLAN) technology is established by IEEE 802.11 standard association. IEEE 802.11a/b among IEEE 802.11 standards provides 11 Mbps (IEEE 802.11b) or 54 Mbps (IEEE 802.11a) transmission efficiency using unlicensed band on 2.4. GHz or 5 GHz frequency band. IEEE 802.11g, adapting OFDM (Orthogonal Frequency Divisional Multiplexing) technology, provides 54 Mbps transmission efficiency. And, IEEE 802.11n, adapting MIMO-OFDM technology, provides 300 Mbps transmission efficiency for 4 spatial streams. IEEE 802.11n provides 40 MHz channel bandwidth, and in this case it provides up to 600 Mbps transmission efficiency.

Now, a standard for regulating the WLAN operation in TV White Space is under establishment, as IEEE 802.11af.

TV Whitespace includes channels allocated to broadcast TV, which are permitted to be used by cognitive radio device, and includes 512-698 MHz spectrum. The spectrum not used by a licensed device (hereinafter, can be called as 'White Space') can be used by an unlicensed device. Here, 'licensed device' means a device of the user permitted in this frequency band, and can be differently called as 'primary user', or 'incumbent user' Hereinafter, the term of 'incumbent user' can be collectively used for these terms.

The unlicensed device, which wishes to use the TV White Space (TVWS), shall acquire information for available channel list at its location. Hereinafter, the unlicensed device operating in the TVWS using MAC (Medium Access Control) and PHY (Physical) operation according to IEEE 802.11 can be called as TVWS terminal.

Unlicensed device should provide a protection mechanism for the incumbent user. That is, the unlicensed device should stop using a specific channel, when an incumbent user, such as wireless microphone, is using that specific channel. For this purpose, spectrum sensing mechanism is required. Spectrum sensing mechanism comprises Energy Detection scheme, Feature Detection scheme, etc. By using this mechanism, unlicensed device determines that the channel is used by an incumbent user, when the strength of the primary signal is greater than a predetermined level, or when DTV (Digital Television) Preamble is detected. And, the unlicensed device (station or Access Point) shall lower its transmission power, when it is detected that the neighboring channel, next to the channel used by the unclosed device, is used by the incumbent user.

When unlicensed devices operate on licensed bandwidth such as TVWS, the unlicensed devices are classified as enabling stations and dependent stations.

An enabling station is a station which can enable a dependent station. The enabling station can transmit a signal without receiving an enabling signal and initiate network. On the other hand, a dependent station can transmits a signal only when receiving an enabling signal and operate under control of an enabling station. However, when the dependent station receives enabling signal from a dependent AP, it cannot perform enablement because it does not know an address of an enabling station.

SUMMARY OF THE INVENTION

One aspect of the present invention is for the enabling mechanism of letting the unlicensed device to operate efficiently in TVWS.

One example of this aspect is for providing a solution for the specific case when dependent station receives enabling signal from a dependent AP station.

The object of the present invention is not limited the above stated objects, but includes various objects recited or apparent among the detailed description of the present invention.

One aspect of the present invention provides a method of performing an enablement procedure by a dependent station in a wireless local area network, the method comprising: receiving, from a dependent AP (access point), an enabling signal generated by an enabling station to permit the dependent station to operate within a TV white space; receiving, from the dependent AP, a DSE Link identifier element including a MAC address of the enabling station; and exchanging DSE (dynamic station enablement) related messages with the enabling station, wherein the enabling station is a station determining available channels at its location using its own geographic location identification and a regulatory database access capability, and the dependent station is a station receiving an available channel list from the enabling station or the dependent AP of that enabling station that enables an operation of the dependent station.

Another aspect of the present invention provides a method of supporting an enablement procedure of a dependent station by a dependent AP (access point) station in a wireless local area network, the method comprising: transmitting, to the dependent station, an enabling signal generated by an enabling station to permit the dependent station to operate within a TV white space; and transmitting, to the dependent station, a DSE Link identifier element including a MAC address of the enabling station, wherein the enabling station is a station determining available channels at its location using its own geographic location identification and a regulatory database access capability, and the dependent station is a station receiving an available channel list from the enabling station or the dependent AP of that enabling station that enables an operation of the dependent station.

Still another aspect of the present invention provides an apparatus as a dependent station for performing an enablement procedure in a wireless local area network, the apparatus comprising: a transceiver configured to receive an enabling signal generated by an enabling station to permit the dependent station to operate within a TV white space and a DSE Link identifier element including a MAC address of the enabling station, from a dependent AP (access point) having an authority for a permission of operating of the apparatus, and to exchange DSE (dynamic station enablement) related messages with the enabling station; and a processor configured to process the enabling signal and the DSE Link identifier element.

Still another aspect of the present invention provides an apparatus as a dependent AP (access point) station for supporting an enablement procedure of a dependent station in a wireless local area network, the apparatus comprising: a transceiver configured to transmit an enabling signal generated by an enabling station to permit the dependent station to operate within a TV white space and a DSE Link identifier element including a MAC address of the enabling station; and a processor configured to generate the DSE Link identifier element.

Preferably, the DSE Link identifier element further includes a BSSID (Basic Service Set identifier) of a BSS to which the enabling station is associated when the DSE related messages are exchanged over the air.

More preferably, the DSE Link identifier element includes an Element ID filed, a length field, a responder station address filed and a BSSID filed.

More preferably, the responder station address field is set to the MAC address of the enabling station.

More preferably, the DSE Link identifier element is received via a beacon frame.

More preferably, the DSE Link identifier element is received via a probe response frame.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 6 shows an exemplary format of DSE Registered Location Element, FIG. 7 shows an exemplary format of Registered Location element body field, FIG. 8 shows another example of the present invention regarding the address of the enabling STA, FIG. 10 shows an exemplary format of DSE Link identifier element of one embodiment of the present invention, FIG. 11 shows an exemplary DSE Enablement Frame format, FIG. 12 shows an exemplary structure of WSM element according to one embodiment of the present invention, FIG. 13 shows one exemplary structure of TV Band WSM according to an embodiment of the present invention, FIG. 14 is an exemplary format of MAP ID bits according to one example of the present invention, FIG. 15 is an exemplary format of WSM information according to one example of the present invention, FIG. 16 shows an exemplary White Space Map Announcement Frame structure according to one embodiment of the present invention.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

For the convenience of description and better understanding of the present invention, general structures and devices well known in the art will be omitted or be denoted by a block diagram or a flow chart.

First of all, Wireless Local Area Network (WLAN) system in which embodiments of the present invention can be applied is explained.

Figure 1:
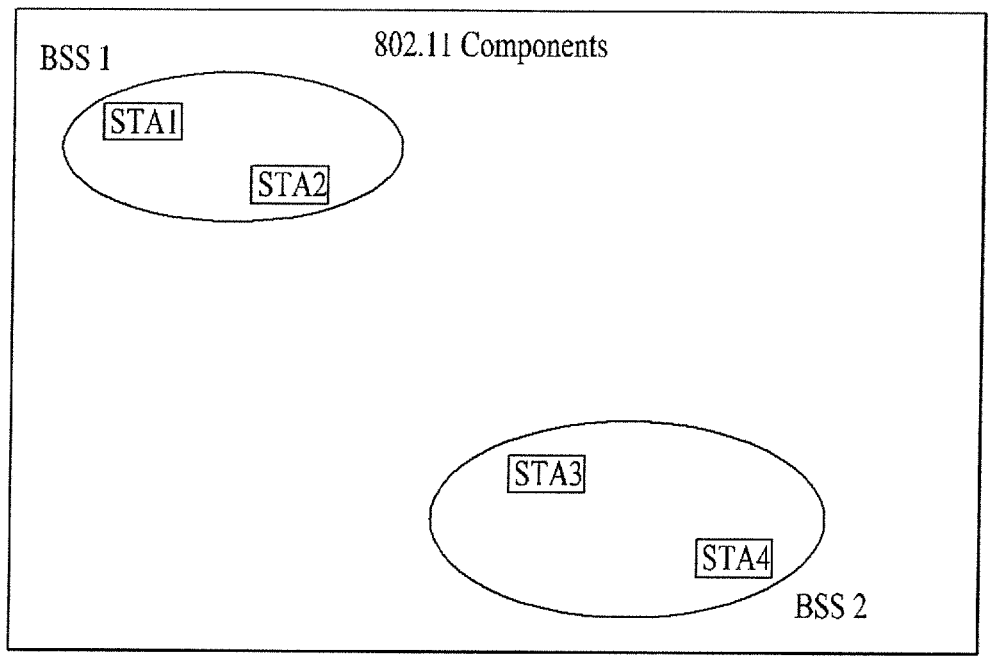
FIG. 1 shows an exemplary architecture of IEEE 802.11 system.

FIG. 1 shows an exemplary architecture of IEEE 802.11 system.

The IEEE 802.11 architecture consists of several components that interact to provide a WLAN that supports STA (station) mobility transparently to upper layers. The basic service set (BSS) is the basic building block of an IEEE 802.11 LAN. FIG. 1 shows two BSSs, each of which has two STAs that are members of the BSS. It is useful to think of the ovals used to depict a BSS as the coverage area within which the member STAs of the BSS may remain in communication. (The concept of area, while not precise, is often good enough.) This area is called the Basic Service Area (BSA). If a STA moves out of its BSA, it can no longer directly communicate with other STAs present in the BSA.

The independent BSS (IBSS) is the most basic type of IEEE 802.11 LAN. A minimum IEEE 802.11 LAN may consist of only two STAs. Since the BSSs shown in FIG. 1 are simple and lack other components (contrast this with FIG. 2), the two can be taken to be representative of two IBSSs. This mode of operation is possible when IEEE 802.11 STAs are able to communicate directly. Because this type of IEEE 802.11 LAN is often formed without pre-planning, for only as long as the LAN is needed, this type of operation is often referred to as an ad hoc network.

A STA's membership in a BSS is dynamic (STAs turn on, turn off, come within range, and go out of range). To become a member of a BSS, a STA joins the BSS using the synchronization procedure. To access all the services of an infrastructure BSS, a STA shall become "associated." These associations are dynamic and involve the use of the distribution system service (DSS).

Figure 2:
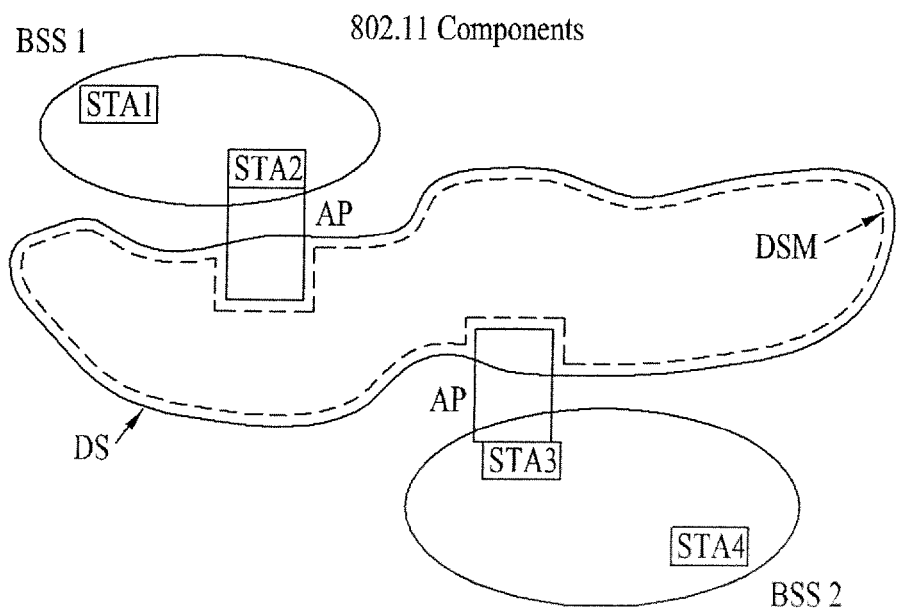
FIG. 2 is another exemplary architecture of IEEE 802.11 system in which the DS, DSM and AP components are added to the IEEE 802.11 architecture picture.

FIG. 2 is another exemplary architecture of IEEE 802.11 system in which the DS, DSM and AP components are added to the IEEE 802.11 architecture picture.

PHY limitations determine the direct station-to-station distance that may be supported. For some networks, this distance is sufficient; for other networks, increased coverage is required. Instead of existing independently, a BSS may also form a component of an extended form of network that is built with multiple BSSs. The architectural component used to interconnect BSSs is the DS (Distribution System).

IEEE Std 802.11 logically separates the WM (wireless Medium) from the distribution system medium (DSM). Each logical medium is used for different purposes, by a different component of the architecture. The IEEE 802.11 definitions neither preclude, nor demand, that the multiple media be either the same or different.

Recognizing that the multiple media are logically different is the key to understanding the flexibility of the architecture. The IEEE 802.11 LAN architecture is specified independently of the physical characteristics of any specific implementation.

The DS enables mobile device support by providing the logical services necessary to handle address to destination mapping and seamless integration of multiple BSSs.

An access point (AP) is any entity that has STA functionality and enables access to the DS, via the WM for associated STAs.

Data move between a BSS and the DS via an AP. Note that all APs are also STAs; thus they are addressable entities. The addresses used by an AP for communication on the WM and on the DSM are not necessarily the same.

Data sent to the AP's STA address by one of the STAs associated with it are always received at the uncontrolled port for processing by the IEEE 802.1X port access entity. In addition, if the controlled port is authorized, these frames conceptually transit the DS.

Hereinafter, Extended service set (ESS) for a large coverage network is explained.

Figure 3:
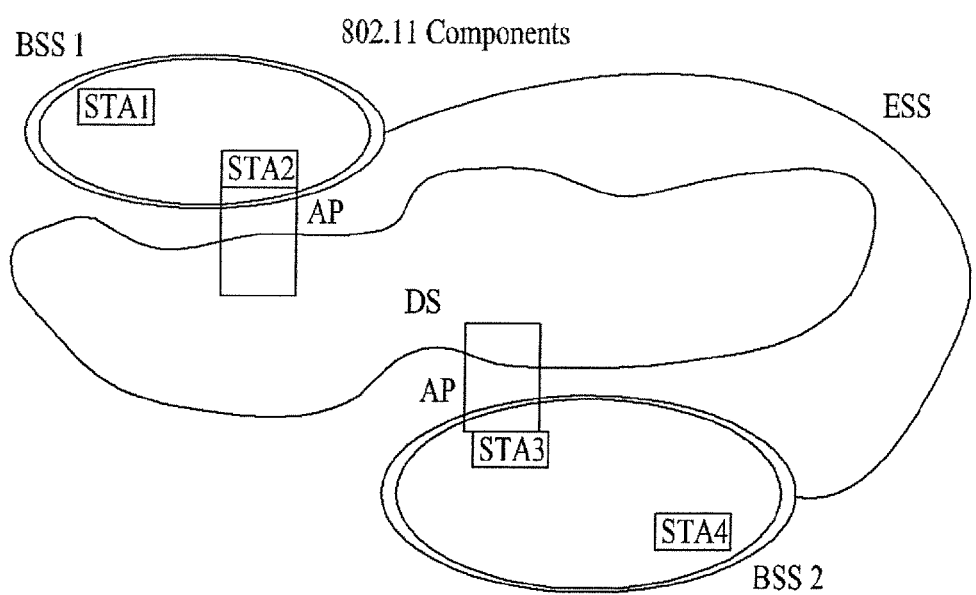
FIG. 3 shows another exemplary architecture of IEEE 802.11 system for explaining the concept of ESS.

FIG. 3 shows another exemplary architecture of IEEE 802.11 system for explaining the concept of ESS.

The DS and BSSs allow IEEE Std 802.11 to create a wireless network of arbitrary size and complexity. IEEE Std 802.11 refers to this type of network as the ESS network. An ESS is the union of the BSSs connected by a DS. The ESS does not include the DS. The key concept is that the ESS network appears the same to an LLC (logical link control) layer as an IBSS network. STAs within an ESS may communicate and mobile STAs may move from one BSS to another (within the same ESS) transparently to LLC.

Nothing is assumed by IEEE Std 802.11 about the relative physical locations of the BSSs in FIG. 3. All of the following are possible:

a) The BSSs may partially overlap. This is commonly used to arrange contiguous coverage within a physical volume.

b) The BSSs could be physically disjoint. Logically there is no limit to the distance between BSSs.

c) The BSSs may be physically collocated. This may be done to provide redundancy.

d) One (or more) IBSS or ESS networks may be physically present in the same space as one (or more) ESS networks. This may arise for a number of reasons. Some examples are when an ad hoc network is operating in a location that also has an ESS network, when physically overlapping IEEE 802.11 networks have been set up by different organizations, and when two or more different access and security policies are needed in the same location.

Figure 4:
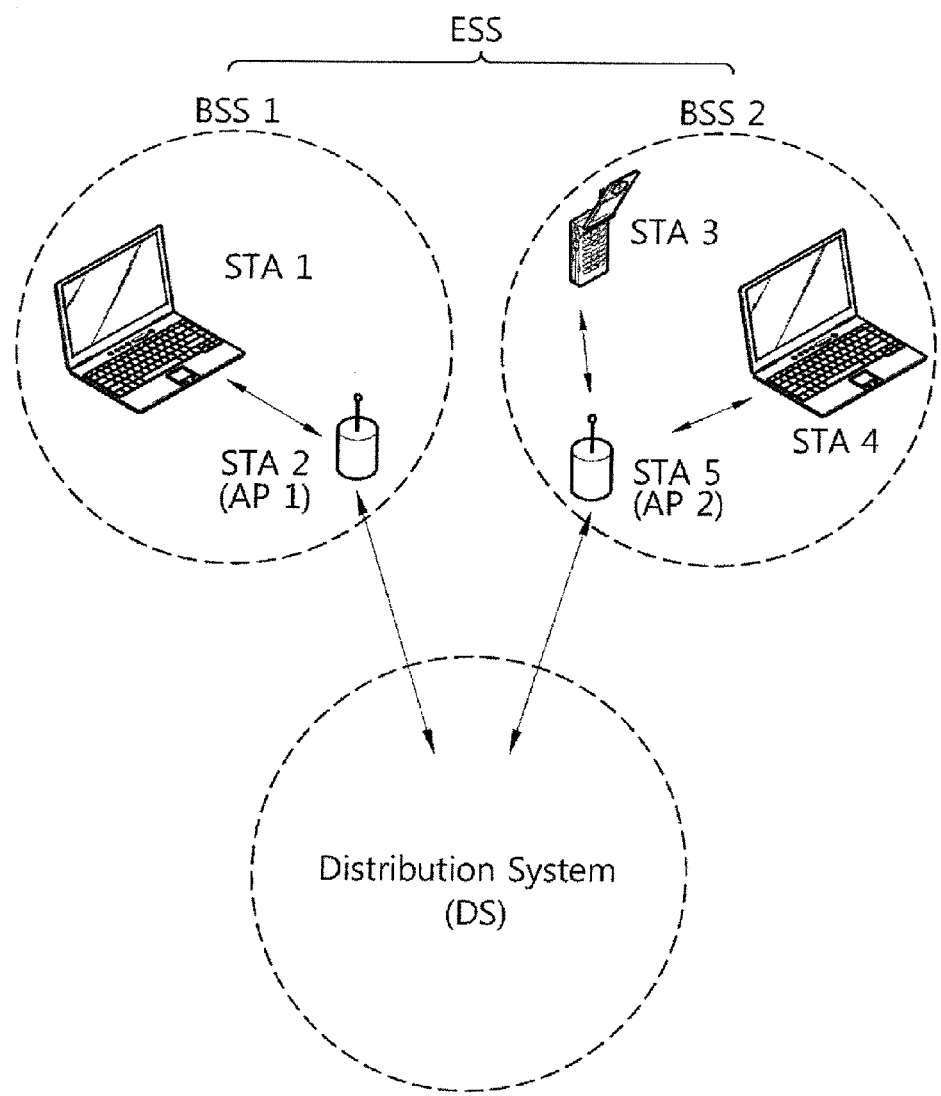
FIG. 4 shows exemplary system architecture for better understanding the WLAN system.

FIG. 4 shows exemplary system architecture for better understanding the WLAN system.

As can be understood, FIG. 4 is an example of infrastructure BSS including DS. And BSS 1 and BSS 2 consist of ESS.

In WLAN system, a STA is a device operating according to MAC/PHY regulation of IEEE 802.11, and includes an AP STA and non-AP STA, such a laptop computer, mobile phone, etc. Usually, the device which a user directly handles is non-AP STA. Hereinafter, non-AP STA can be differently called as (terminal), WTRU (Wireless Transmit/Receive Unit), User Equipment (UE), Mobile Station (MS), Mobile Terminal, Mobile Subscriber Unit, etc. And, non-AP STA, which can operate within TVWS spectrum, can be called as 'Non-AP WS STA' or 'WS STA'. AP can corresponds to Base Station (BS), Node-B, BTS (Base Transceiver System), or Femto BS in another field of wireless communication. AP, which can operate within TVWS, can be called as WS AP.

Based on this understanding, the enabling mechanism of letting the unlicensed device to operate in TVWS according to one aspect of the present invention is explained.

In order for the unlicensed device to operate in TVWS, the unlicensed device should acquire information for available channels in TVWS not used by incumbent users. The most casual approach for this is defining such that all the unlicensed devices performs sensing whether there is a primary signal of the incumbent user on each of the channels in TVWS. However, it may cost huge overhead, thus another approach can be using a regulatory database, such as TV band database which includes information which of the channels are available for the WLAN operation at specific geographic location. The present invention prefers to use the latter approach.

Further, if all the unlicensed devices access the regulatory database to acquire information for the available channels, it may be inefficient, and produce large signaling overhead. Thus, embodiments of the present invention propose to classify the unlicensed devices (STAs) into an enabling STA, and a dependent STA. Enabling STA in TVWS is defined as a STA determines the available TV channels at its location using its own geographic location identification and TV bands database access capabilities. Dependent STA in TVWS is defined as a STA receives available TV channel list from the enabling STA or the dependent AP of that enabling STA that enables its operation. Thus, according to the embodiment, enabling STA takes the role to permit the dependent STA to operate within TVWS within the available channels (the role to enable the dependent STA). This enabling procedure can be called as dynamic station enablement (DSE) procedure.

Figure 5:
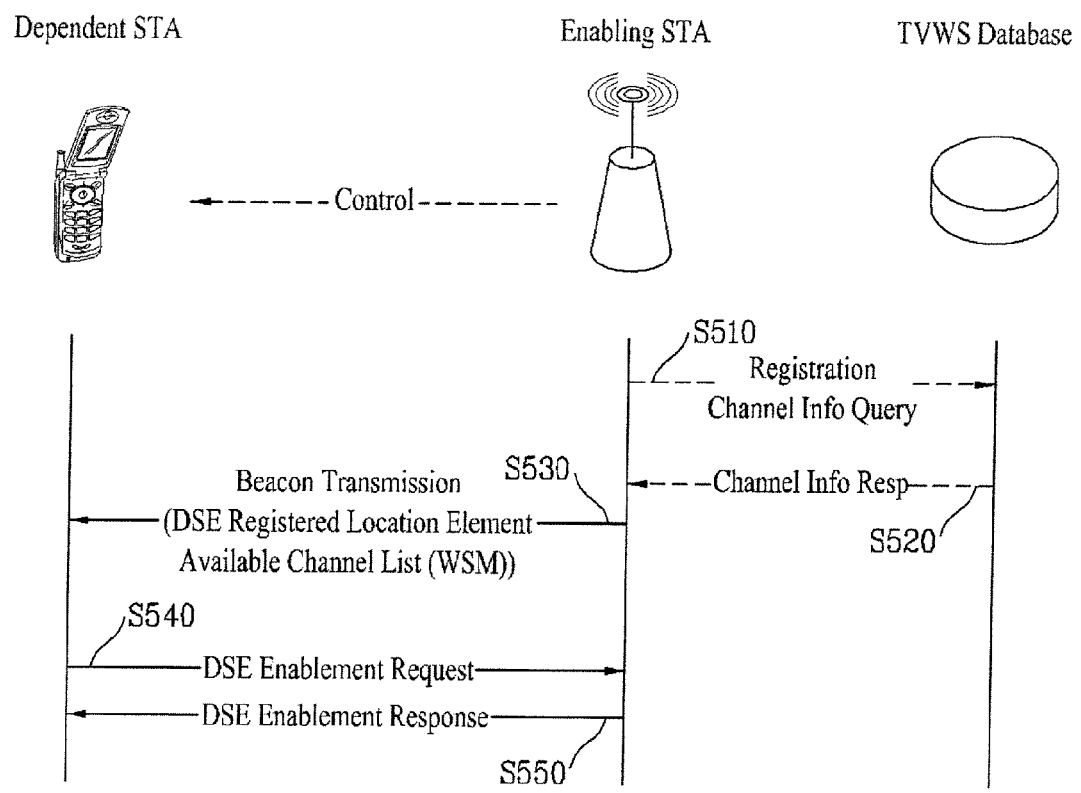
FIG. 5 is a conceptual diagram to explain the enabling mechanism according to one embodiment of the present invention.

FIG. 5 is a conceptual diagram to explain the enabling mechanism according to one embodiment of the present invention.

In FIG. 5, there are TVWS database, an enabling STA and a dependent STA. The enabling STA can be either an AP STA or non-AP STA. But, in an example of FIG. 5, assume that the enabling STA is an AP enabling STA.

According to the embodiment, the enabling STA access the TVWS database for registration and querying channel information (S510). It is more efficient for the enabling STA to acquire available channel list from TVWS database than sensing each of the channels to determine whether it is available or not. Thus, the enabling STA of the present embodiment acquires the available channel list from TVWS database via Channel Info Response (S520).

Then, the enabling AP STA of this example may transmit beacon frame to the dependent STA (S530) as an enabling signal to permit the dependent STA to operate within TVWS. According to one embodiment of the present invention, this enabling signal comprises the beacon frame containing a DES Registered Location Element with 'DSE RegLoc bit' set to 1. Further, the present embodiment proposes to transmit information for the available channel list from TVWS. Hereinafter, the available channel list from TVWS can be called as White Space Map (WSM) or WSM element.

The dependent STA, according to the present embodiment, should operate within the available channels identified by the received WSM. And, the dependent STA, according to the present embodiment, may exchange DSE related message with the enabling STA. More specifically, the dependent STA may transmit DSE Enablement Request message to the enabling STA for the enablement of the dependent STA (S540). Then, the enabling STA may respond to this request by DSE Enablement Response message (S550).

And, one embodiment of the present invention proposes that the enabling station transmits the WSM after the transmission of a DSE Enablement frame (not shown in FIG. 5). It is efficient for the dependent station to reduce scanning time for searching network to be connected.

FIG. 6 shows an exemplary format of DSE Registered Location Element, and FIG. 7 shows an exemplary format of Registered Location element body field.

As stated above, DSE Registered Location element (FIG. 6) with RegLoc DSE bit (FIG. 7) set to 1 can be an enabling signal permitting the dependent STA to operate WLAN operation in TVWS. The dependent STA receiving and decoding the DSE Registered Location element, may transmit Enablement Request Frame to the Enabling STA. Then, the enabling STA transmits Enablement Response Frame to the dependent STA, and if the dependent STA receives it, the DSE procedure is completed.

On the other hand, dependent STA according to IEEE 802.11y should receive the enabling signal from the enabling STA over-the-air. However, this requirement is not necessarily applied to TV White Space. Therefore, the dependent AP also can transmit the enabling signal by transmitting beacon frame, probe response frame including DSE Registered Location element.

FIG. 8 shows another example of the present invention regarding the address of the enabling STA.

The DSE procedure between the enabling STA and the dependent AP STA is the same as shown in FIG. 5. As stated above, dependent AP receives the enabling signal (DSE Registered Location element with DSE RegLoc bit set to 1) and WSM from enabling STA, transmits DSE Enablement request message, receives DSE Enablement response message, and then enabled.

In this example, the dependent AP STA also can transmit enable signal (DSE Registered Location element with DSE RegLoc bit set to 1) to the dependent STA (S410). Here, dependent AP may transmit beacon frame including DSE Registered Location element through non-TVWS Link.

Dependent AP of the present embodiment shall inform the dependent STA that this DSE Registered Location element is transmitted by the dependent AP. Thus, Reserved Bit (B126) of DSE Registered Location element (FIG. 7) can be used as 'Dependent AP indication bit'.

Figure 9:
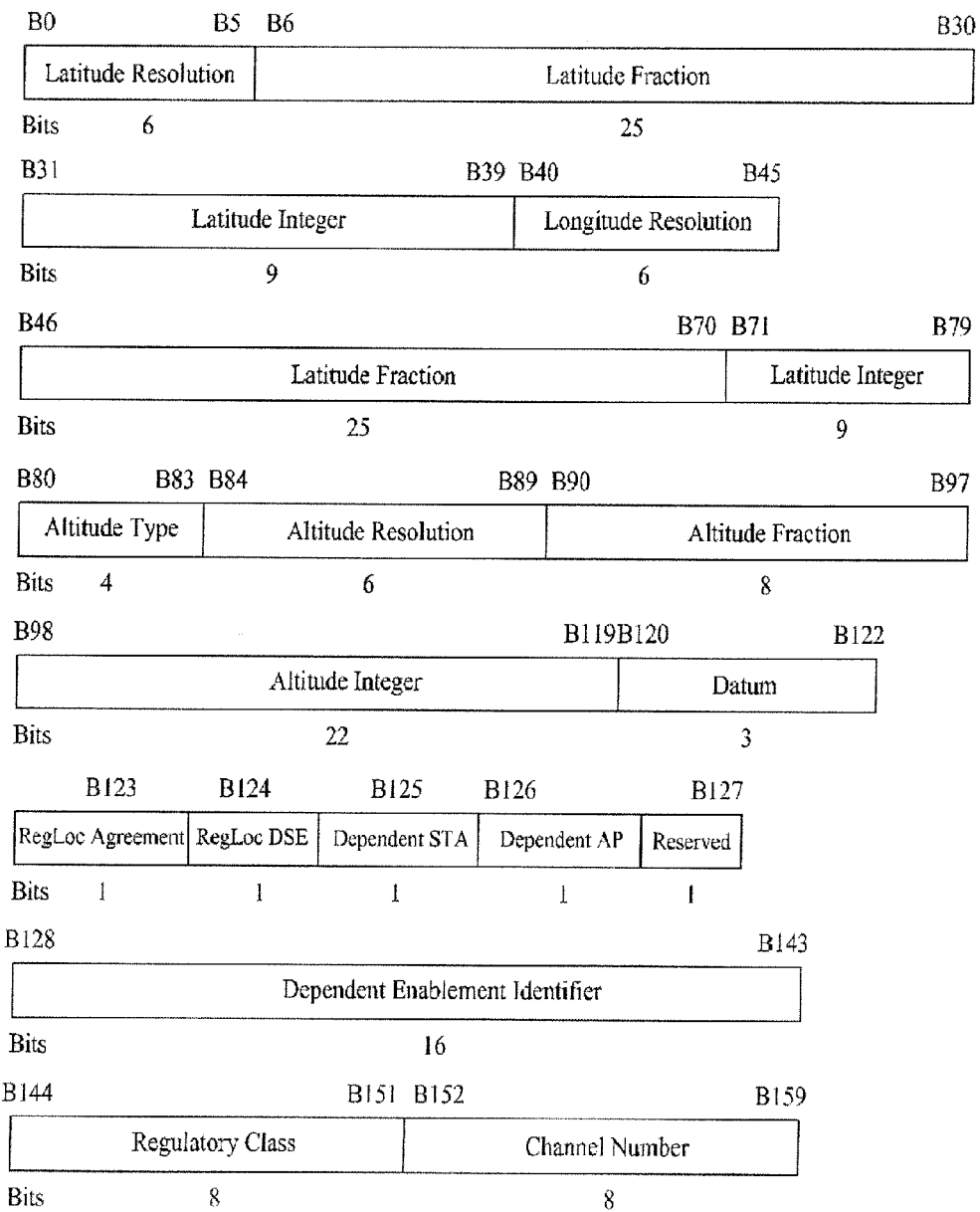
FIG. 9 shows a newly defined DSE Registered location element body field according to one example of the present invention.

FIG. 9 shows a newly defined DSE Registered location element body field according to one example of the present invention. As shown in FIG. 5, the newly defined DSE Registered location element includes Dependent AP bit.

Table 1 shows the values of Dependent STA bit and Dependent AP bit according to the subject of transmitting DSE Registered location element.

TABLE 1

| | Dependent STA bit value | Dependent AP bit value |
|---|---|---|
| Enabling STA | False | False |
| Dependent AP | True | True |
| Dependent STA | True | False |

As shown in Table 1, Dependent AP bit is used to identify Dependent AP from Dependent STA. That is, dependent STA receiving DSE Registered location element can be informed whether the DSE Registered location element it transmitted from the dependent AP STA or enabling STA based on the values of Dependent STA bit and Dependent AP bit.

On the other hand, the DSE Registered location element may only include the transmitter's address in it. Thus, if the dependent STA receives the enabling signal from the dependent AP, the dependent STA can't know the address of the enabling signal. In this case, the dependent STA can't transmit the DSE Enablement Request to the enabling STA. Therefore, one embodiment of the present invention proposes for the dependent AP STA to transmit a DSE Link identifier element including MAC address of the enabling STA during the DSE procedure.

FIG. 10 shows an exemplary format of DSE Link identifier element of one embodiment of the present invention.

In (a) of FIG. 10, the Element ID field is equal to the DSE Link Identifier value. The Length field may be set to 12. The ResponderSTAAddress field is the MAC address of the enablement responder STA that grants enablement (enabling STA). The length of the ResponderSTAAddress field may be 6 octets.

The BSSID field may set to the BSSID of the BSS to which the enablement responder STA is associated. When the DSE enablement messages are exchanged over the air, the dependent STA should know the BSSID associated with the enabling STA. Thus, When the DSE enablement messages are not exchanged over the air, the BSSID field may not be present.

In (b) of FIG. 10, DSE Link identifier element may further includes enabling STA timestamp field for time synchronization among enabling STA, dependent AP and dependent STA associated to the corresponding AP.

Referring back to FIG. 8, dependent AP transmits DSE Link identifier element to the dependent STA (S420). By using this, the dependent STA can acquire the MAC address of the enabling STA. Thus, the dependent STA may transmit DSE Enablement frame to the enabling STA for the enablement (S430). Here, the dependent STA transmits DSE Enablement frame on the available channels identified by WSM.

Further, according to another embodiment of the present invention, the dependent STA may broadcast DSE identifier element including the address of the enabling STA. When, the dependent STA is AP STA, this DSE Identifier element can be transmitted via beacon frame or probe response frame.

FIG. 11 shows an exemplary DSE Enablement Frame format.

When DSE Enablement Frame format of FIG. 11 is DSE Enablement frame for DSE Enablement Request, Requester-STAAddress field indicates MAC address of STA transmitting this DSE Enablement Frame, and ResponderSTAAddress field indicates MAC address of STA receiving this DSE Enablement Frame. Reason Result Code field may indicates whether this DSE Enablement Frame is for DSE Enablement Request, or DSE Enablement Response. Enablement identifier field may indicate enablement ID allocated by the enabling STA to the dependent STA, when DSE Enablement Frame is for DSE Enablement Response.

Thus, RequesterSTAAddress field of the DSE Enablement frame for DSE Enablement request transmitted by dependent STA indicates the MAC address of the dependent STA, and ResponderSTAAddress field indicates the MAC address of the enabling STA, and Reason Result Code field indicates this DSE Enablement Frame is for DSE Enablement Request. And, Enablement identifier field is set to invalid value.

Address 3 field of MAC header of DSE Enablement Request frame is set to BSSID field of DSE Link Identifier element, ResponderSTAAddress field of DSE Enablement Request frame is set to MAC address of the enabling STA receiving DSE Enablement Request frame via DSE Link Identifier element.

As shown in FIG. 8, enabling STA receiving the DSE Enablement Request frame transmits DSE enablement frame for DSE Enablement Response (S440). Here, Enabling STA may allocate (Dependent) Enablement Identifier of 16 bits to the dependent STA.

When DSE Enablement Frame format of FIG. 11 is for DSE Enablement Response, the RequesterSTAAddress field of the DSE Enablement frame for DSE Enablement Response indicates the MAC address of the enabling STA, ResponderSTAAddress field indicates the MAC address of the Dependent STA, Reason Result Code field indicates that the DSE Enablement frame is for DSE Enablement Response. And, Enablement identifier field may include Enablement ID allocated to the dependent STA by the enabling STA.

As stated above, the enabling STA (or the dependent AP STA) may transmit the available channel list (WSM) from TVWS database such that the dependent STA operates within the available channels identified by the WSM. The enabling STA can transmit this WSM via beacon frame, Probe response frame, or White Space Map Announcement frame. WSM structure according to one aspect of the present invention will be explained.

FIG. 12 shows an exemplary structure of WSM element according to one embodiment of the present invention.

WSM element comprises available channel list from the regulatory database. Further, as stated above, when the unlicensed device operates on a specific channel which is available in TVWS and the neighboring channel next to the specific channel is used by an incumbent user, the unlicensed device should lower its transmission power to protect the incumbent user. Therefore, one embodiment of the present invention proposes WSM element comprising available channel list and maximum allowed transmission power of the available channels from the regulatory database Actual maximum of transmission power level may be decided depending on the channel bandwidth and the maximum allowed transmission powers per available channel. When the operational channel bandwidth (WLAN channel) spans multiple channels indicated in the WSM, whose maximum power levels are different, the operational transmission power level shall be constrained by the minimum transmission power level of those multiple channels, which are indicated in the WSM.

Preferably, as shown in FIG. 12, WSM element may comprise Element ID field, Length field, WSM Type field and WSM Information field.

Element ID field may indicates that this element is White Space Map element. Length field has a variable value in a unit of octet corresponding to the length of WSM. Since the numbers of available channels and corresponding maximum power level values are variable, the length field may indicate the length of WSM element.

WSM type field may indicate the type of WSM information. Specifically, WSM type may indicate whether WSM information is TV Band WSM, or other type of WSM. If WSM type indicates that the present WSM element is TV Band WSM element, this WSM element is a WSM element including the available channel list and the maximum transmission powers allowed for each of the available channels, which was acquired from TV band database by the enabling STA.

According to one example of the present invention, the information in a WSM element is valid for a 'dot11WhiteSpaceMapValidTime' from the transmission of the beacon frame containing WSM element. The value of 'dot11WhiteSpaceMapValidTime' may be predetermined between STAs/APs. If the WSM is invalid, APs are preferred not to transmit a WSM element and preferred not to transmit any signal in the regulatory bands and dependent STAs become unenabled. If an enabled dependent STA does not receive a WSM within dot11WhiteSpaceMapValidTime, it becomes unenabled.

FIG. 13 shows one exemplary structure of TV Band WSM according to an embodiment of the present invention.

As shown in FIG. 13, TV Band WSM may comprise MAP ID field, Channel Number field, Maximum Power Level field.

Map ID field is an identifier of the TV band WSM information field format for a TV band WSM and the format of the Map ID bits is illustrated in FIG. 14.

Referring to FIG. 14, type bit is one bit in length and indicates whether the following channel list is a full channel list or a partial channel list. If the Type bit is set to 1, the following channel list is a full channel list and if the Type bit is set to 0, the following channel list is a partial channel list.

Map version of FIG. 14 may be 6 bits in length and identifies the version of WSM. When the available channel information from the TV band database is updated and the corresponding WSM is updated, then the Map version is circularly incremented by 1 and the default bit value of the Map version is 0000000.

If a STA receives several WSMs with the same Map version and the Type bit is set to 0 (partial WSM), the STA shall construct the whole channel list using the multiple WSMs having the same Map version.

Now, referring back to FIG. 13, the Channel Number field may be a positive integer value that indicates where the TV channel is available for WLAN operation. The length of the Channel Number field may be set as 1 octet. When the Channel Number and Maximum Power Level pairs are repeated (as indicated in FIG. 13), they shall be listed in increasing TV channel numbers. FIG. 15 is an exemplary format of WSM information.

Hereinafter, White Space Map Announcement Frame structure according to one example of the present invention is explained.

FIG. 16 shows an exemplary White Space Map Announcement Frame structure according to one embodiment of the present invention.

The White Space Map Announcement frame may use the Action frame body format as shown in FIG. 16. The Category field may be set to the value for predefined public action defined. The Action field may be set to the value indicating White Space Map Announcement frame. The remaining fields are as defined in the White Space Map element body explained above.

Figure 17:
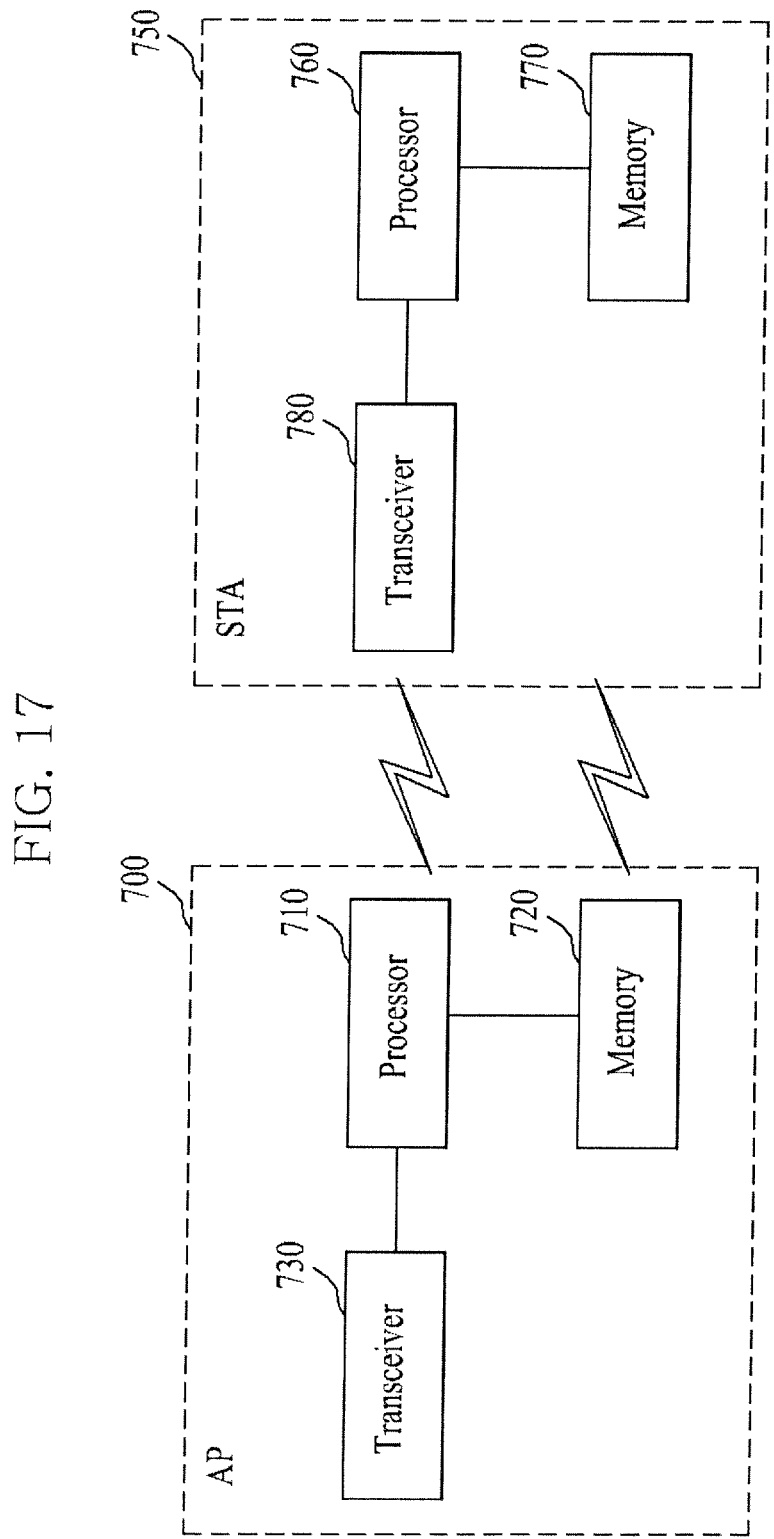
FIG. 17 is a schematic block diagram of wireless apparatuses implementing an exemplary embodiment of the present invention.

FIG. 17 is a schematic block diagram of wireless apparatuses implementing an exemplary embodiment of the present invention.

An AP 700 can include a processor 710, a memory 720, a transceiver 730, and a STA 750 may include a processor 760, a memory 770, and a transceiver 780. The transceivers 730 and 780 transmit/receive a radio signal and implement an IEEE 802 physical layer. The processors 710 and 760 are connected with the transceivers 730 and 760 to implement an IEEE 802 physical layer and/or MAC layer. The processors 710 and 760 may implement the above-described channel scanning method.

The processors 710 and 760 and/or the transceivers 730 and 780 may include an application-specific integrated circuit (ASIC), a different chip set, a logical circuit, and/or a data processing unit. The memories 720 and 770 may include a read-only memory (ROM), a random access memory (RAM), a flash memory, a memory card, a storage medium, and/or any other storage units. When an exemplary embodiment is implemented by software, the above-described scheme may be implemented as a module (process, function, etc.) performing the above-described functions. The module may be stored in the memories 720 and 770 and executed by the processors 710 and 760. The memories 720 and 770 may be disposed within or outside the processors 710 and 760 and connected with the processors 710 and 760 via well-known means.

Among these elements of apparatuses for AP/STA, the structure of processor 710 or 760 will be more specifically explained.

Figure 18:
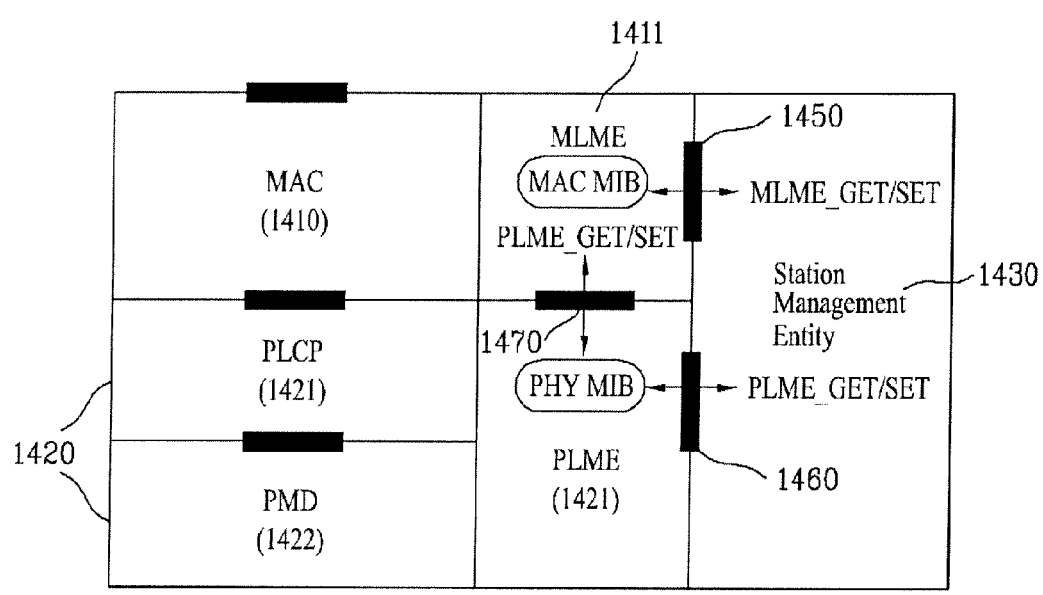
FIG. 18 shows an exemplary structure of processor of STA apparatus according to one embodiment of the present invention.

FIG. 18 shows an exemplary structure of processor of STA apparatus according to one embodiment of the present invention.

Processor 710 or 760 of STA may have multiple layer structures, and FIG. 4 especially focuses on MAC sublayer (1410) on data link layer (DLL) and Physical layer (1420) among these layers. As shown in FIG. 18, PHY (1420) may include PLCP entity (physical layer convergence procedure entity; 1421) and PMD entity (physical medium dependent entity; 1422). Both the MAC sublayer (1410) and PHY (1420) conceptually include management entities, called MLME (MAC sublayer Management Entity; 1411) and PLME (physical layer management entity; 1421), respectively. These entities (1411, 1421) provide the layer management service interfaces through which layer management functions can be invoked.

In order to provide correct MAC operation, an SME (Station Management Entity; 1430) is present within each STA. The SME (1430) is a layer independent entity that can be viewed as residing in a separate management plane or as residing "off to the side." The exact functions of the SME (1430) are not specified in this document, but in general this entity (1430) can be viewed as being responsible for such functions as the gathering of layer-dependent status from the various layer management entities (LMEs), and similarly setting the value of layer-specific parameters. SME (1430) would typically perform such functions on behalf of general system management entities and would implement standard management protocols.

The various entities within FIG. 18 interact in various ways. FIG. 18 shows some examples of exchanging GET/SET primitives. XX-GET.request primitive is used for requesting the value of the given MIBattribute (management information base attribute). XX-GET.confirm primitive is used for returning the appropriate MIB attribute value if status="success," otherwise returning an error indication in the Status field. XX-SET.request primitive is used for requesting that the indicated MIB attribute be set to the given value. If this MIB attribute implies a specific action, then this requests that the action be performed. And, XX-SET.confirm primitive is used such that, if status="success," this confirms that the indicated MIB attribute was set to the requested value, otherwise it returns an error condition in status field. If this MIB attribute implies a specific action, then this confirms that the action was performed.

As shown in FIG. 18, MLME (1411) and SME (1430) may exchange various MLME_GET/SET primitives via MLME_SAP (1450). According to one example of the present invention, SME (1430) may transmit MLME_WSM.request primitive to MLME (1411) for requesting MLME (1411) to transmit the White Space Map Announcement Frame to another STA. In other case, MLME (1411) may transmit MLME-WSM.indication primitive to SME (1430) to indicate the reception of the White Space Map Announcement Frame from another STA.

Also, as shown in FIG. 18, various PLCM_GET/SET primitives may be exchanged between PLME (1421) and SME (1430) via PLME_SAP (1460), and between MLME (1411) and PLME (1470) via MLME-PLME_SAP (1470).

WSM element of one example of the present invention can be transmitted by the sequential procedures of MAC (1410) and PHY (1420). Also, WSM element of one example of the present invention can be received by the sequential procedures of PHY (1420) and MAC (1410).

Although the embodiments of the present invention have been disclosed in view of each aspect of the invention, those skilled in the art will appreciate that embodiments of each aspect of the invention can be incorporated. And, there can be advantages not explicitly discussed, since they are obvious from the description for those skilled in the art.

According to each aspect of the present invention, effective enabling mechanism is provided.

Especially, it is more efficient to classify the unlicensed devices as an enabling station and a dependent station, wherein the enabling station is a station determining the available channels at its location using its own geographic location identification and a regulatory database access capability, while the dependent station is a station receiving the available channel list from the enabling station or a dependent AP (Access Point) station that enables the operation of the dependent station. It is because if all the unlicensed devices decide their own enablement in TVWS, all of them have to have regulatory database access capability, and there shall be a signaling overhead.

And, one example of the present invention provide a solution for the case when dependent station receives enabling signal from a dependent AP station. That is, by transmitting/receiving the MAC address of the enabling station during the DSE procedure, the dependent station may know the MAC address of the enabling station even when the enabling signal is received from a dependent AP station.

Various effects, not explicitly recited in this section, can be achieved by the present invention according to the following description.

What is claimed is:

1. A method of performing an enablement procedure by a dependent station in a wireless local area network, the method comprising:

receiving, from a dependent access point (AP), an enabling signal generated by an enabling station to permit the dependent station to operate TV white space;

receiving, from the dependent AP, a dynamic station enablement (DSE) Link identifier element providing information on the enabling station, a MAC address of the enabling station, and a Basic Service Set identifier (BSSID) of the enabling station;
transmitting a DSE enablement request frame to the enabling station, a BSSID field of the DSE enablement request frame being the same as the BSSID of the enabling station provided in the received DSE Link identifier element, a responder station address field of the DSE enablement request frame being the same as the MAC address of the enabling station provided in the received DSE Link identifier element; and
receiving, from the enabling station, a DSE enablement response frame,
wherein the enabling station is a station determining available channels at its location using its own geographic location identification and a regulatory database access capability, and the dependent station is a station receiving an available channel list from the enabling station or the dependent AP of the enabling station that enables an operation of the dependent station,
wherein the dependent station, the dependent AP, and the enabling station are different entities, and
wherein each of the dependent station and the dependent AP is enabled by the enabling station.

2. The method of claim 1, wherein the DSE enablement request frame is transmitted over the air from the dependent station to the enabling station using the BSSID of the enabling station is included in the DSE Link identifier element.

3. The method of claim 1, wherein the DSE Link identifier element includes an Element ID field, a length field, a responder station address field, and a BSSID field.

4. The method of claim 3, wherein the responder station address field is set to the MAC address of the enabling station, and the BSSID field is set to the BSSID of a basic service set (BSS) to which the enabling station is associated.

5. The method of claim 1, further comprising receiving, from the dependent AP, a white space map element which indicates an available channel list in the TV white space.

6. The method of claim 1, wherein the DSE Link identifier element is received via a beacon frame.

7. The method of claim 1, wherein the DSE Link identifier element is received via a probe response frame.

8. The method of claim 1, wherein the DSE Link identifier element further comprises a time stamp field for a time synchronization among the dependent station, the dependent AP, and the enabling station.

9. A method of supporting an enablement procedure of a dependent station by a dependent access point (AP) station in a wireless local area network, the method comprising:
transmitting, to the dependent station, an enabling signal generated by an enabling station to permit the dependent station to operate within a TV white space;
transmitting, to the dependent station, a dynamic station enablement (DSE) Link identifier element providing information on the enabling station, a MAC address of the enabling station, and a Basic Service Set identifier (BSSID) of the enabling station; and
wherein a DSE enablement request frame is transmitted from the dependent station to the enabling station, a BSSID field of the DSE enablement request frame being the same as the BSSID of the enabling station provided in the received DSE Link identifier element, a responder station address field of the DSE enablement request frame being the same as the MAC address of the enabling station provided in the received DSE Link identifier element,
wherein a DSE enablement response frame is transmitted from the enabling station to the dependent station,
wherein the enabling station is a station determining available channels at its location using its own geographic location identification and a regulatory database access capability,
wherein the dependent station is a station receiving an available channel list from the enabling station or the dependent AP of the enabling station that enables an operation of the dependent station,
wherein the dependent station, the dependent AP, and the enabling station are different entities, and
wherein each of the dependent station and the dependent AP is enabled by the enabling station.

10. The method of claim 9, wherein the DSE enablement request frame is transmitted over the air from the dependent station to the enabling station using the BSSID of the enabling station is included in the DSE Link identifier element.

11. The method of claim 9, wherein the DSE Link identifier element includes an Element ID field, a length field, a responder station address field, and a BSSID field.

12. The method of claim 11, wherein the responder station address field is set to the MAC address of the enabling station, and the BSSID field is set to the BSSID of a basic service set (BSS) to which the enabling station is associated.

13. The method of claim 9, further comprising transmitting, to the dependent station, a white space map element which indicates an available channel list in the TV white space.

14. The method of claim 9, wherein the DSE Link identifier element is transmitted via a beacon frame.

15. The method of claim 9, wherein the DSE Link identifier element is transmitted via a probe response frame.

16. The method of claim 9, wherein the DSE Link identifier element further comprises a time stamp field for a time synchronization among the dependent station, the dependent AP, and the enabling station.

17. An apparatus as a dependent station for performing an enablement procedure in a wireless local area network, the apparatus comprising:
a transceiver configured to receive an enabling signal generated by an enabling station to permit the dependent station to operate within a TV white space and a dynamic station enablement (DSE) Link identifier element providing information on the enabling station, a MAC address of the enabling station, and a Basic Service Set identifier (BSSID) of the enabling station, from a dependent access point (AP) having an authority for a permission of operating of the apparatus, to transmit a DSE enablement request frame to the enabling station, wherein a BSSID field of the DSE enablement request frame is the same as the BSSID of the enabling station provided in the received DSE Link identifier element, a responder station address field of the DSE enablement request frame is the same as the MAC address of the enabling station provided in the received DSE Link identifier element, and to receive, from the enabling station, a DSE enablement response frame; and
a processor configured to process the enabling signal and the DSE Link identifier element,
wherein the enabling station is a station determining available channels at its location using its own geographic location identification and a regulatory database access capability, and the dependent station is a station receiving an available channel list front the enabling station or the dependent AP of the enabling station that enables an operation of the dependent station, and wherein the dependent station, the dependent AP and the enabling station are different entities, and each of the dependent station and the dependent AP is enabled by the enabling station.

18. The apparatus of claim 17, wherein the DSE enablement request frame is transmitted over the air from the dependent station to the enabling station using the BSSID of the enabling station is included in the DSE Link identifier element.

19. The apparatus of claim 17, wherein the DSE Link identifier element includes an Element ID field, a length field, a responder station address field, and a BSSID field.

20. The apparatus of claim 19, wherein the responder station address field is set to the MAC address of the enabling station, and the BSSID field is set to the BSSID of a basic service set (BSS) to which the enabling station is associated.

21. The apparatus of claim 17, wherein the DSE Link identifier element further comprises a time stamp field for a time synchronization among the dependent station, the dependent AP, and the enabling station.

22. An apparatus as a dependent access point (AP) station for supporting enablement procedure of a dependent station in a wireless local area network, the apparatus comprising:
    a transceiver configured to transmit an enabling signal generated by an enabling station to permit the dependent station to operate within a TV white space and a dynamic station enablement (DSE) Link identifier element providing information on the enabling station, a MAC address of the enabling station, and a Basic Service Set identifier (BSSID) of the enabling station; and
    a processor configured to generate the DSE Link identifier element,
    wherein a DSE enablement request frame is transmitted from the dependent station to the enabling station, a BSSID field of the DSE enablement request frame being the same as the BSSID of the enabling station provided in the received DSE Link identifier element, a responder station address field of the DSE enablement request frame being the same as the MAC address of the enabling station provided in the received DSE Link identifier element,
    wherein a DSE enablement response frame is transmitted from the enabling station to the dependent station,
    wherein the enabling station is a station determining available channels at its location using its own geographic location identification and a regulatory database access capability,
    wherein the dependent station is a station receiving an available channel list from the enabling station or the dependent AP of the enabling station that enables an operation of the dependent station,
    wherein the dependent station, the dependent AP and the enabling station are different entities, and
    wherein each of the dependent station and the dependent AP is enabled by the enabling station.

23. The apparatus of claim 22, wherein the DSE enablement request frame is transmitted over the air from the dependent station to the enabling station using the BSSID of the enabling station is included in the DSE Link identifier element.

24. The apparatus of claim 22, wherein the DSE Link identifier element en includes an Element ID field, a length field, a responder station address field, and a BSSID field.

25. The apparatus of claim 24, wherein the responder station address field is set to the MAC address of the enabling station, and the BSSID field is set to the BSSID of a basic service set (BSS) to which the enabling station is associated.

26. The apparatus of claim 22, wherein the DSE Link identifier element further comprises a time stamp field for a time synchronization among the dependent station, the dependent AP, and the enabling station.

* * * * *